US008667729B2

(12) United States Patent
Coffield

(10) Patent No.: US 8,667,729 B2
(45) Date of Patent: Mar. 11, 2014

(54) GRINDING AND DISPERSION DEVICE

(75) Inventor: Richard Coffield, Bluffton, SC (US)

(73) Assignee: Richard Coffield, Bluffton, SC (US)

( * ) Notice: Subject to any disclaimer, the term of this patent is extended or adjusted under 35 U.S.C. 154(b) by 626 days.

(21) Appl. No.: 12/883,917

(22) Filed: Sep. 16, 2010

(65) Prior Publication Data

US 2011/0062258 A1    Mar. 17, 2011

Related U.S. Application Data

(60) Provisional application No. 61/242,833, filed on Sep. 16, 2009.

(51) Int. Cl.
*A01K 97/02* (2006.01)

(52) U.S. Cl.
USPC ........................................ 43/44.99

(58) Field of Classification Search
USPC ............... 43/44.99; 241/69, 46.017, 46.01
See application file for complete search history.

(56) References Cited

U.S. PATENT DOCUMENTS

| | | | | |
|---|---|---|---|---|
| 2,932,459 A * | 4/1960 | Roe | | 241/46.17 |
| 3,089,652 A * | 5/1963 | Haber | | 241/69 |
| 3,459,247 A * | 8/1969 | Goodman | | 241/38 |
| 5,346,143 A * | 9/1994 | Askin | | 241/46.017 |
| 5,720,124 A | 2/1998 | Wentzell et al. | | |
| 6,015,106 A * | 1/2000 | Turgeon et al. | | 241/69 |
| 6,138,400 A | 10/2000 | Gervae | | |
| 6,581,322 B1 * | 6/2003 | Spinelli | | 43/44.99 |
| 7,181,883 B1 * | 2/2007 | Nassef | | 43/44.99 |

FOREIGN PATENT DOCUMENTS

JP    03272635 A  * 12/1991  ............. A01K 97/02

OTHER PUBLICATIONS

Translation of JP 03272635, published Dec. 1991, to Sakida.*

* cited by examiner

*Primary Examiner* — Darren W Ark
*Assistant Examiner* — Kathleen Alker
(74) *Attorney, Agent, or Firm* — Clements Bernard PLLC; Seth L. Hudson

(57) ABSTRACT

The present invention provides a device for grinding and dispersing aquatic life including a tube having a first end and a second end, and a cap positioned on the first end. A second end includes a motor and a blade for grinding and dispersing aquatic life, wherein the aquatic life is inserted into the cylindrical tube through the cap, and the aquatic life moves down the tube towards the blade, whereby the aquatic life is ground and then dispersed into the water.

8 Claims, 3 Drawing Sheets

GRINDING AND DISPERSION DEVICE

CROSS REFERENCE TO RELATED PATENT APPLICATION

The current application claims the benefit of the earlier priority filing date of the provisional application Ser. No. 61/242,833 that was filed on Sep. 16, 2009.

FIELD OF THE INVENTION

The present invention relates generally to a grinding device and dispersion device for use in fishing, and more generally relates to a self-contained, submersible, motorized apparatus for chopping bait and dispersing chum to attract fish.

BACKGROUND OF THE INVENTION

The use of chum in fishing is widely known and has been used for many years. Traditionally, bait is chopped, turning the bait into chum, and the chum is placed into buckets. While fishing, an individual will throw the chum overboard and into the water to attract fish. There are a number of apparatuses that have been patented that disperse the chum into the water, alleviating the need for an individual to throw the chum overboard from the boat. However, there is a need for a device that will cleanly, efficiently, and effectively chop bait into chum and disperse within the water.

BRIEF SUMMARY OF THE INVENTION

The present invention provides a device for grinding and dispersing aquatic life including a tube having a first end and a second end, and a cap positioned on the first end. A second end includes a motor and a blade for grinding and dispersing aquatic life, wherein the aquatic life is inserted into the cylindrical tube through the cap, and the aquatic life moves down the tube towards the blade, whereby the aquatic life is ground and then dispersed into the water.

According to another embodiment of the present invention, the device includes a plurality of holes disposed within the tube.

According to yet another embodiment of the present invention, the device includes a cylindrical tube.

According to yet another embodiment of the present invention, the device includes a rechargeable battery for providing power to the motor.

According to yet another embodiment of the present invention, the device includes a motor shaft disposed on the second end.

According to yet another embodiment of the present invention, the device includes a frustoconical portion disposed on the motor shaft for decreasing drag.

According to yet another embodiment of the present invention, the device includes a rudder engaged to the motor shaft.

According to yet another embodiment of the present invention, the device includes a motor shaft containing a cavity for receiving the motor therein.

According to yet another embodiment of the present invention, the device includes a tube that has a first end and a second end. A cap is positioned on the first end. The second end of the tube comprises a motor shaft that has a cavity therein for receiving a motor. The motor includes a blade for grinding and dispersing aquatic life, wherein the aquatic life is inserted into the tube through the cap, and the aquatic life moves down the tube towards the blade, whereby the aquatic life is ground.

According to yet another embodiment of the present invention, a method for grinding and dispersing bait, including providing a cylindrical tube having a first end and a second end. A cap releasably engaged to the first end and a motor engaged to the second end, wherein the motor includes a blade that is positioned within the cylindrical tube. The cap is removed from the first end of the cylindrical tube, and bait is inserted into the cylindrical tube. The bait is ground with the blade of the motor forming chum, and the chum is dispersed within the water.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
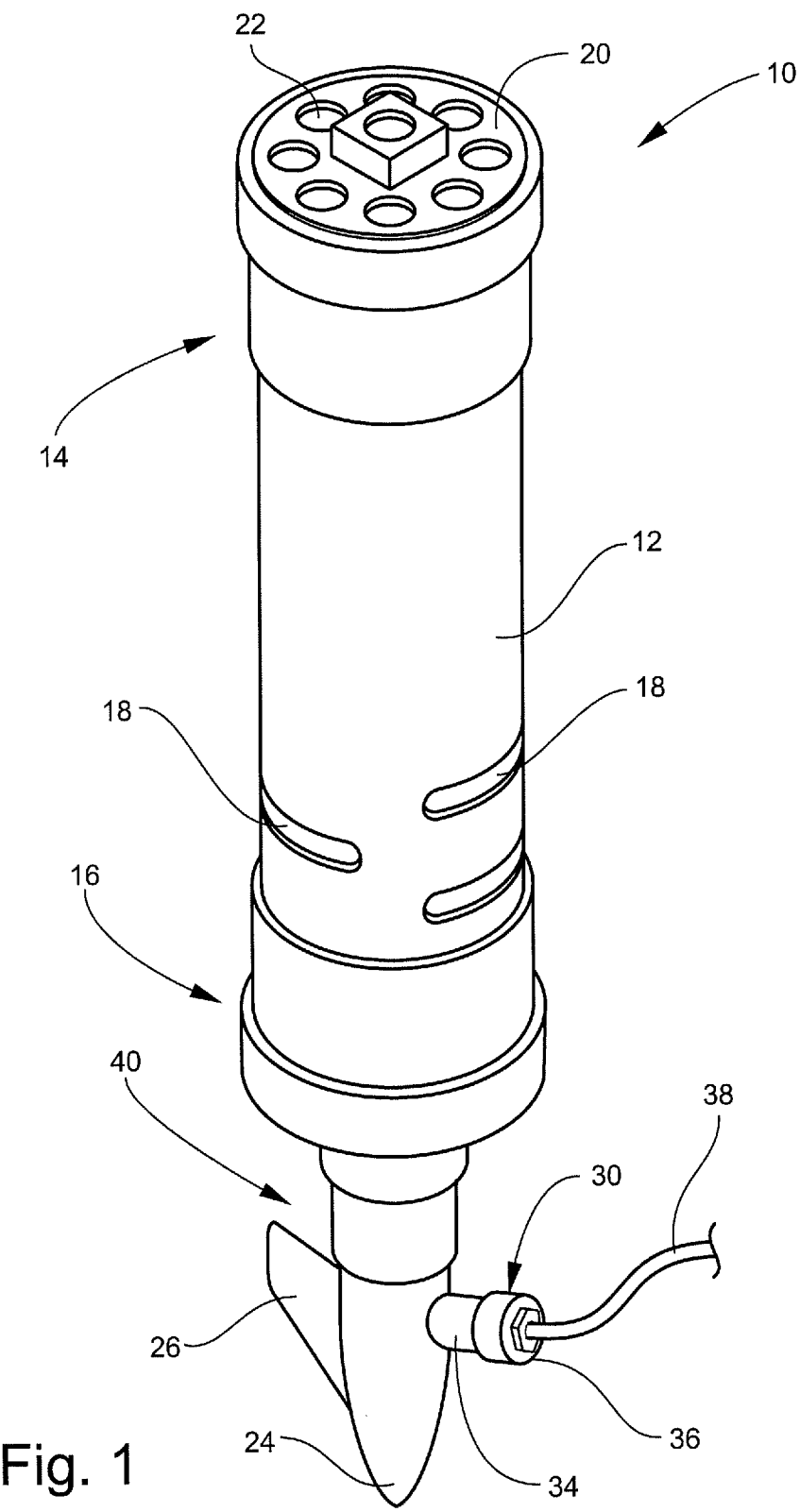
FIG. 1 is a perspective view of one embodiment of the present invention.
Figure 2:
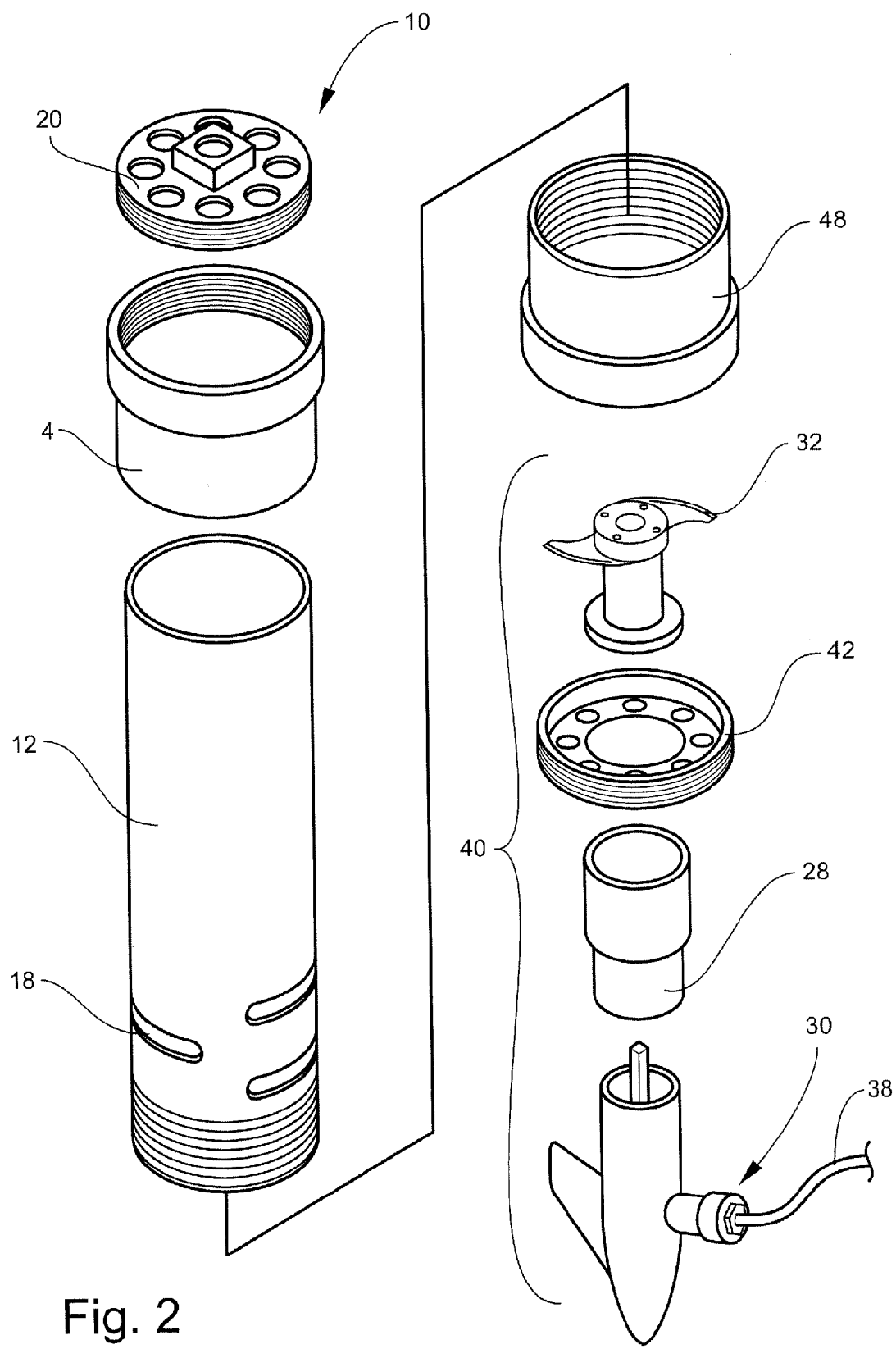
FIG. 2 is an exploded view of one embodiment of the present invention.

Referring now specifically to the drawings, a grinding and dispersion device is illustrated according to a preferred embodiment of the present invention and is illustrated in FIGS. 1 and 2 and is shown generally at reference numeral 10. According to the preferred embodiment of FIG. 1, the device 10 includes a tube 12, preferably a cylindrical tube, having a cavity therein with a first end 14 and a second end 16. The cylindrical tube 12 includes a plurality of holes 18. The first end 14 includes a cap 20 with a plurality of holes 22. The second end 16 includes a frustoconical portion 24, a rudder 26, a motor 28, a power supply portion 30, and a blade 32. The motor 28 drives the blade 32 for chopping bait inserted into the cylindrical tube 12, making chum.

The motor 22 is a submersible motor known to one of ordinary skill in the art. The motor 22 is able to withstand the rigors associated with being submerged in water on the exterior of a boat. Preferably, the motor 22 is able to withstand the harsh elements of a salt water environment. The motor 22 is connected to a power source located within the boat. Alternatively, the device 10 may be powered by a rechargeable battery located within a waterproof compartment housing the motor 22 (not shown). The rechargeable battery may supply the necessary power to the motor 22. The rechargeable battery may be recharged via an electrical connector that receives power from an external power source.

The power supply portion 30 consists of a cylindrical base 34 engaged to the second end 16. Preferably, the power supply portion 30 is located opposite the rudder 26 on the frustoconical portion 24. An electrical interface (not shown) is housed within the power supply portion 30 for transferring power to the motor 28. A lid 36 is selectively secured to the cylindrical base 34, forming a water resistant compartment. When the lid 36 is selectively secured to the cylindrical base 34, little, if any, water may contact the electrical interface. The lid 36 may also include a bore for threading a power supply 38 through the lid 36. The power supply 38 is connected at one end to the electrical interface and the other end contains clips for securing the power supply to a battery or the like on a boat. Alternatively, the power supply 38 may be hardwired to the electronics on the boat.

The first end 14 of the cylindrical tube 12 is threaded on the inner portion of the cylindrical tube 12. Alternatively, a threaded cap 20 may be disposed on the first end 14 of the cylindrical tube 12. The cap 20 contains corresponding threads for releasably attaching the cap 20 to the first end 14 of the cylindrical tube 12. The purpose of the cap 20 is to insert aquatic life, such as bait fish, into the cylindrical tube 12. The holes 22 on the cap 20 allow water to freely flow within the cylindrical tube 12. In another embodiment of the invention, the cap 20 may be solid, thus preventing water to freely flow through the cap 20 and into the cylindrical tube 12. Preferably, the cap 20 is easily rotatable for allowing bait to be inserted into the cylindrical tube 12 with ease, but the cap 20 also requires some resistance to rotate so as to not separate from the cylindrical tube 12 while in the water.

The second end 16 of the cylindrical tube 12 includes a frustoconical portion 24, a rudder 26, a motor 28, a power supply portion 30, and a blade 32. The frustoconical portion 24, rudder 26, and power supply portion 30 are connected to a motor shaft 40. The motor shaft 40 contains a cylindrical base 42, containing threads on an outer rim. The threads on the outer rim are designed to releasably attach to corresponding threads on the inner portion of the cylindrical tube 12. Alternatively, a threaded cap 48 may be disposed on the second end 16 of the cylindrical tube 12.

The frustoconical portion 24 is designed to allow the device 10 to glide through the water when pulled by a boat. The frustoconical portion 24 reduces the drag associated with the device 10, thus reducing the resistance of the device 10 being carried through the water. The rudder 26 is designed to keep the device 10 flowing in the linear direction parallel to the direction of the boat. The rudder 26 prevents the device 10 from diverting "off-course," thus reducing the amount of drag associated with the device when pulled by a boat.

The motor shaft 40 contains a cavity designed to house the motor 28 therein. The motor 28 itself is fully contained within the motor shaft 40, which creates a water resistant compartment. Preferably, no water enters the cavity, but on some occasions it is expected that a small amount of water or condensation may collect in the cavity. Protruding through the bottom of the motor shaft 40 is the blade 32. When the motor shaft 40 is engaged to the cylindrical tube 12, the blade 32 is fully contained within the cylindrical tube 12 for producing chum.

During use, the bait is inserted into the first end 14 of the cylindrical tube 12. The motor 28 is activated, thus turning the blade 32. The bait moves down the length of the cylindrical tube 12 toward the blade 32, and then the bait is chopped by the blade 32, forming chum. The chum is then expelled through the holes 18. The chum may also be expelled though the holes 22 of the cap 20.

The device 10 is preferably held to the transom of a boat by a releasably secured means such as a clip. Alternatively, the device 10 may be secured to the boat by a rope, wire, or the like.

It should be noted that it is preferable to have a cylindrical tube 12, but this language should not be limiting. The tube 12 can be any shape that allows bait to flow through the cavity.

In another embodiment of the present invention, a resettable circuit breaker (not shown) is included within the motor shaft 40. If the blade 32 becomes clogged the resettable circuit breaker disables the motor 28, allowing the user to dislodge the impediment. The resettable circuit breaker is then reset, permitting the motor to resume normal operation. The resettable circuit breaker is a safety device that may be incorporated into the device 10 for disabling the motor 28, while the blade 32 is obstructed by an impediment. Since the motor 28 is disabled, the blade 32 cannot begin rotating when the user's hand is clearing the impediment. In lieu thereof or in addition thereto, a pressure switch (not shown) may be included on the first end 14 of the tube 12 and disposed adjacent the cap 20. When the pressure switch is depressed by the inclusion of the cap 20 on the tube 12, the motor 28 may operate freely. However, when the cap 20 is removed, the pressure exerted by the cap 20 is removed and the motor 28 is disabled.

Figure 3:
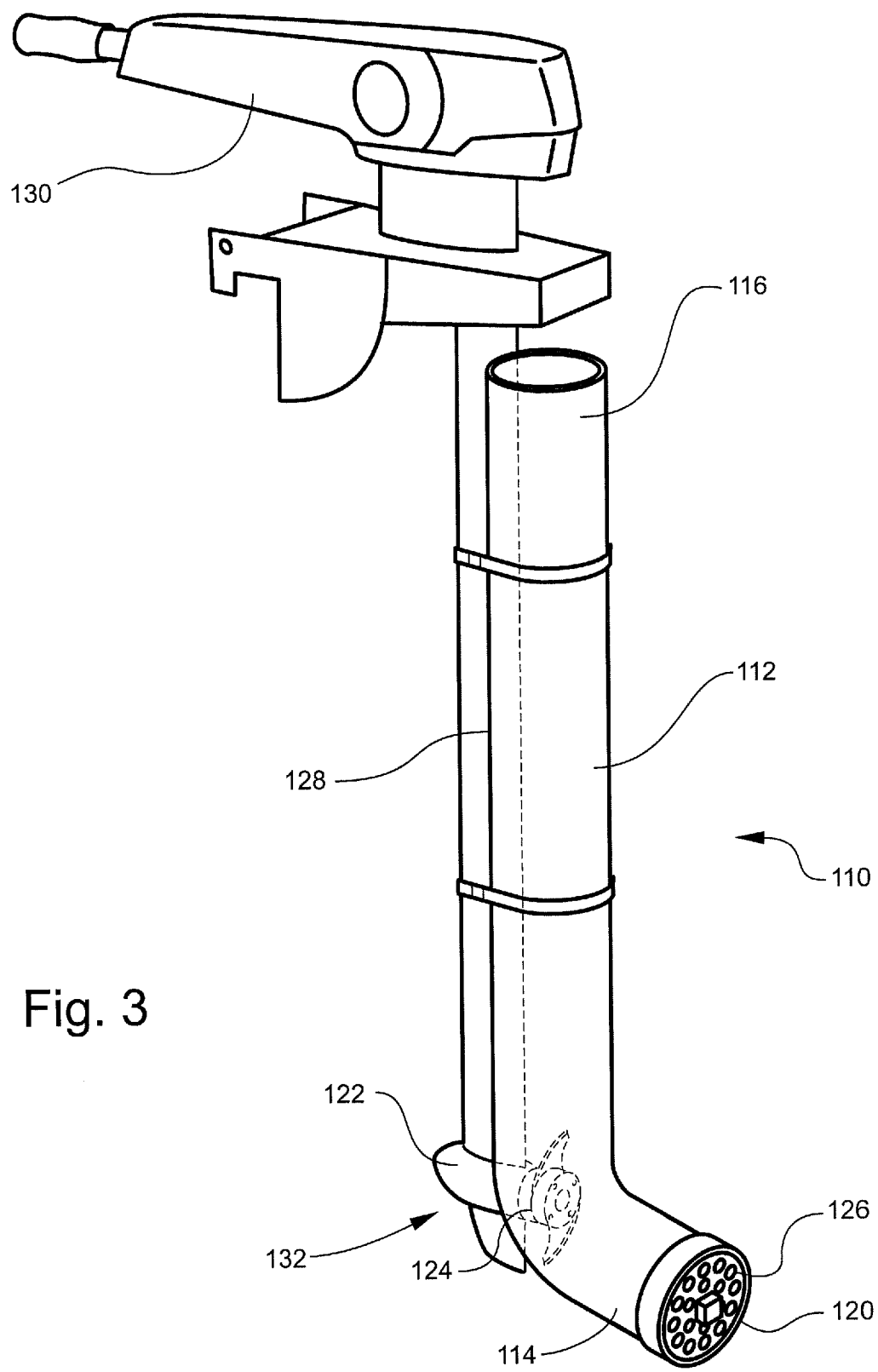
FIG. 3 is a perspective view of another embodiment of the present invention.

Another preferred embodiment of a device is illustrated in FIG. 3 and is shown generally at reference numeral 110. According to the preferred embodiment of FIG. 3, the device 110 includes a cylindrical tube 112 with a first end 114 and a second end 116. The first end 114 includes a cap 120 with a plurality of holes 126. A motor 122 is positioned within the cylindrical tube 112. The motor 122 drives a blade 124 for chopping bait inserted into the cylindrical tube 112, making chum.

As shown in FIG. 3, a trolling motor may be utilized in the alternative embodiment as the motor 122. The motor 122 is a submersible motor known to one of ordinary skill in the art. The motor 122 is able to withstand the rigors associated with being submerged in water on the exterior of a boat. Preferably, the motor 122 is able to withstand the harsh elements of a salt water environment. The motor 122 is connected to a power source located within the boat. Alternatively, the device 110 may be powered by a rechargeable battery located within a waterproof compartment housing the motor 122 (not shown). The rechargeable battery may supply the necessary power to the motor 122. The rechargeable battery may be recharged via an electrical connector that receives power from an external power source.

In the embodiment illustrated in FIG. 3, utilizing a trolling motor 122, the shaft 128 of the trolling motor 122 is mounted to the exterior of the cylindrical tube 112. It is preferable to mount the shaft 128 on the exterior of the cylindrical tube 122 in order to keep the interior of the cylindrical tube 112 clear of obstructions. The controls and handle 130 of the motor 122 are preferably positioned in close proximity to the second end 116 of the cylindrical tube 112.

The first end 114 of the cylindrical tube 112 is threaded on the inner portion of the cylindrical tube 112. The cap 120 contains corresponding threads for releasably attaching the cap 120 to the first end 114 of the cylindrical tube 112. The purpose of the cap 120 is to insert bait into the cylindrical tube 112.

The device 110 is positioned on the boat with a substantial portion of the device 110 submerged below the surface of the water, including the first end 114 of the cylindrical tube 112 that includes the motor 122. The second end 116 of the cylindrical tube 112 is positioned above the surface of the water. The second end 116 of the cylindrical tube 112 includes an open end for inserting bait into the cylindrical tube 112. As the bait is inserted into the second end 116 of the cylindrical tube 112, the bait progresses along the length of the cylindrical tube 112 toward the motor 122 and blade 124. The blade 124 chops the bait into chum. The chum then exits the cylindrical tube 112 through the holes 126 within the cap 120 positioned on the first end 114 of the cylindrical tube 112.

The cylindrical tube 112 may include an elbow 132 in close proximity to the first end 114. As shown in FIG. 3, the motor 122 is positioned within the elbow 132, which allows gravitational forces to bring the bait into contact with the motor 122 and blade 124. After the bait is chopped and turned into chum, the force of the blade 124 expels the chum from the device 110 through the holes 126 in the cap 120 into the water.

The device 110 is preferably held to the boat by a releasably secured means such as a clip. Alternatively, the device 110 may be secured to the boat by a rope, wire, or the like.

The present invention also provides for a method for grinding and dispersing bait. The method includes providing a tube, preferably cylindrical, having a first end and a second end, a cap releasably engaged to the first end, and a motor engaged to the second end, wherein the motor includes a blade that is positioned within the cylindrical tube. The cap is removed from the first end of the cylindrical tube and bait is inserted into the cylindrical tube. The bait is then ground with the blade of the motor forming chum and dispersed in the water.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A device for grinding and dispersing aquatic life, comprising:
   a tube having a first end that is threaded and a second end;
   a cap is positioned on the first end that contains threads that correspond with the threaded first end for releasably attaching the cap to the first end of the tube;
   the second end includes a frustoconical portion with a rudder extending therefrom, and a motor engaged to the frustoconical portion that drives a blade;
   a plurality of holes disposed on the tube;
   wherein the aquatic life is inserted into the tube through the cap of the first end, and the aquatic life moves down the tube towards the motor and blade at the second end, whereby the aquatic life is ground.

2. The device according to claim 1, further comprising the cap with a plurality of holes.

3. The device according to claim 1, wherein the tube is cylindrical.

4. The device according to claim 1, wherein the second end of the tube is threaded for receiving a correspondingly threaded cap disposed on the second end of the tube.

5. The device according to claim 4, wherein a power supply portion having a cylindrical base is located opposite the rudder on the frustoconical portion.

6. The device according to claim 5, a lid is selectively secured to the cylindrical base and contains a bore for threading a power supply through the lid.

7. A device for grinding and dispersing aquatic life, comprising:
   a cylindrical tube with a constant diameter having a first end and a second end;
   a cap positioned on the first end having a plurality of holes;
   the second end comprising a motor, wherein the motor includes a blade for grinding and dispersing aquatic life; and
   a frustoconical portion is disposed on the second end for decreasing drag;
   wherein the aquatic life is inserted into the tube through the cap, and the aquatic life moves down the tube towards the blade, whereby the aquatic life is ground.

8. A device for grinding and dispersing aquatic life, comprising:
   a cylindrical tube with a constant diameter having a first end and a second end;
   a cap positioned on the first end having a plurality of holes;
   the second end comprising a motor, wherein the motor includes a blade for grinding and dispersing aquatic life; and
   a rudder is engaged to the second end;
   wherein the aquatic life is inserted into the tube through the cap, and the aquatic life moves down the tube towards the blade, whereby the aquatic life is ground.

* * * * *